(12) United States Patent
Jun et al.

(10) Patent No.: US 8,601,824 B2
(45) Date of Patent: Dec. 10, 2013

(54) HEATING AND COOLING SYSTEM FOR VEHICLE SEAT

(75) Inventors: Duck Chae Jun, Seongnam-si (KR); Wook Jeong, Cheonan-si (KR); Man Ju Oh, Ulsan (KR); Jang Su Park, Busan (KR)

(73) Assignee: Hyundai Motor Company, Seoul (KR)

( * ) Notice: Subject to any disclaimer, the term of this patent is extended or adjusted under 35 U.S.C. 154(b) by 741 days.

(21) Appl. No.: 12/775,140

(22) Filed: May 6, 2010

(65) Prior Publication Data

US 2011/0061401 A1    Mar. 17, 2011

(30) Foreign Application Priority Data

Sep. 17, 2009    (KR) .................. 10-2009-0088227

(51) Int. Cl.
   *F25B 21/02*    (2006.01)
(52) U.S. Cl.
   USPC .............................................. 62/3.4; 62/244
(58) Field of Classification Search
   USPC ............... 62/3.4, 244, 272, 279, 3.3; 165/42, 165/104.34, 202
   See application file for complete search history.

(56) References Cited

U.S. PATENT DOCUMENTS

| | | | | |
|---|---|---|---|---|
| 5,456,081 A | * | 10/1995 | Chrysler et al. | ................. 62/3.7 |
| 5,924,766 A | * | 7/1999 | Esaki et al. | ............. 297/180.13 |
| 6,213,198 B1 | * | 4/2001 | Shikata et al. | ................ 165/202 |
| 7,000,490 B1 | * | 2/2006 | Micheels | ................... 73/863.12 |
| 2007/0193279 A1 | * | 8/2007 | Yoneno et al. | ................... 62/3.3 |
| 2009/0031742 A1 | * | 2/2009 | Seo et al. | ........................ 62/244 |
| 2009/0193814 A1 | * | 8/2009 | Lofy | ............................ 62/3.61 |
| 2010/0107656 A1 | * | 5/2010 | Nakaguro et al. | ............... 62/3.4 |

FOREIGN PATENT DOCUMENTS

| | | |
|---|---|---|
| JP | 2-85010 A | 3/1990 |
| JP | 5-277020 A | 10/1993 |
| JP | 9-290626 A | 11/1997 |
| JP | 2001-358372 A | 12/2001 |
| JP | 2004-49521 A | 2/2004 |
| JP | 2005-27731 A | 2/2005 |
| JP | 2005-277020 A | 10/2005 |
| JP | 2006-038311 A | 2/2006 |
| KR | 10-0820029 B1 | 4/2008 |
| WO | WO 2008/025377 * | 9/2006 ............... F24F 3/14 |

* cited by examiner

*Primary Examiner* — Mohammad M Ali

(74) *Attorney, Agent, or Firm* — Morgan, Lewis & Bockius LLP

(57) ABSTRACT

A heating and cooling apparatus for a vehicle seat, may include a blower blowing air into a duct leading to the vehicle seat, and a thermoelectric element assembly connected to the duct and including a thermoelectric element that heats or cools air introduced toward the vehicle seat from the duct, the thermoelectric element having condensed water passages penetrating from one side to the other side thereof to allow condensed water to flow therethrough.

15 Claims, 5 Drawing Sheets

HEATING AND COOLING SYSTEM FOR VEHICLE SEAT

CROSS REFERENCE TO RELATED APPLICATION

The present application claims priority to Korean Patent Application Number 10-2009-0088227 filed on Sep. 17, 2009, the entire contents of which application is incorporated herein for all purposes by this reference.

BACKGROUND OF THE INVENTION

1. Field of the Invention

The present invention relates to a heating and cooling system for a vehicle seat, and more particularly, to one which uses a thermoelectric element as a means for heating and cooling air to be supplied to the seat, and can maintain comfortable environment inside a vehicle by efficiently discharging condensed water, which forms when air is cooled.

2. Description of Related Art

In general, a vehicle is equipped with an air-conditioning system including a cooler and a heater. The air-conditioning system serves to control the temperature inside the vehicle.

However, the air-conditioning system does not have a function of controlling the temperature of a vehicle seat. In the summer, even if an occupant sitting on a vehicle seat lowers the temperature inside the vehicle by operating the cooler, the seat is relatively slowly cooled down. In addition, the seat is continuously warmed by the body heat of the occupant. Then, the occupant may sweat at the buttocks and the back, which would otherwise develop into heat rashes.

In the winter, even if the occupant sitting on the vehicle seat raises the temperature inside the vehicle by operating the heater, the occupant may feel chilly or cold at the buttocks or back since the seat has stayed cold for a long time before the heater is operated.

Accordingly, these days, a seat-dedicated heating and cooling system is additionally provided, which is designed to control the temperature of the seat.

An example of such a heating and cooling system for a vehicle seat will be illustrated with reference to FIG. 1.

The heating and cooling system for a vehicle seat is mounted on the lower part of a vehicle seat composed of a back and a sitting part. The heating and cooling system includes a first duct 2 communicating with the back, a second duct 4 communicating with the sitting part, and a blower 1 blowing air into the ducts 2 and 4. Thermoelectric element housings 3 and 5 are coupled to the front ends of the ducts 2 and 4, respectively, and thermoelectric element units (not shown) are mounted inside the thermoelectric element housings 3 and 5, respectively.

The thermoelectric element housing 3 has two air outlets 3a and 3b. The air outlet 3a serves to supply air, heated or cooled by the thermoelectric element unit, to the seat, and the air outlet 3b serves to exhaust air from the vehicle. The thermoelectric element housing 5 also has two air outlets 5a and 3b, which function substantially the same as those of the thermoelectric element housing 3. When a thermoelectric element is used for heating air to be supplied to the seat, air is heated at one side of the thermoelectric element but is cooled at the other side of the thermoelectric element. Thus, it is required to exhaust cooled air from the vehicle. For this purpose, the thermoelectric element housing is provided with both the air outlet 3a or 5a for supplying air to the seat and the outlet 3b for exhausting air from the vehicle. In addition, the outlet 3b is connected to an exhaust duct 6, which leads to the outside of the vehicle.

When air introduced by the blower 1 is flowing around a cooler of the thermoelectric element assembly, condensed water forms inside the duct if the temperature of the air drops below the dew point. However, once the condensed water is formed inside the duct, it collects inside the duct since the heating and cooling system for a vehicle seat of the related art does not provide a means for discharging the condensed water from the vehicle. The condensed water collected as above may leak into the interior of the vehicle, through joints 7 between the blower 1 and the ducts 2 and 4 and through a joint 8 between the thermoelectric housing 5 and the duct 6. When the condensed water leaks into the interior of the vehicle, it contaminates the interior of the vehicle by causing bacterial contamination and bad smells as well as threatens the health of occupants.

In addition, since the heating and cooling system as described above is configured to heat or cool air using only the thermoelectric element, the efficiency of heating and cooling the seat is disadvantageously low.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a heating and cooling system for a vehicle seat, which can maintain comfortable environment inside a vehicle by efficiently discharging condensed water that forms when air to be supplied to the seat is cooled.

There is also provided a heating and cooling system for a vehicle seat, which can enhance the operating efficiency of a thermoelectric element that heats and cools air.

In an aspect of the present invention, the heating and cooling apparatus for a vehicle seat, may include a blower blowing air into a duct leading to the vehicle seat, and a thermoelectric element assembly connected to the duct and including a thermoelectric element that heats or cools air introduced toward the vehicle seat from the duct, the thermoelectric element having condensed water passages penetrating from one side to the other side thereof to allow condensed water to flow therethrough.

The condensed water passages may allow the condensed water to flow toward a heater of the thermoelectric element by capillary action.

The thermoelectric element assembly may include heat sink fins attached to opposite sides of the thermoelectric element in a heat conductive structure, wherein the heat sink fins have a plurality of through-holes to allow the air to flow therethrough, and wherein the heat sink fins are formed in a perpendicular direction to a longitudinal direction of the duct.

The heating and cooling apparatus may further include a thermoelectric element housing coupled to one end of the duct and enclosing the thermoelectric element assembly therein, wherein the thermoelectric element housing has diverging air outlets through which air cooled by a cooler of the thermoelectric element assembly and air heated by the heater of the thermoelectric element assembly are separately exhausted from the thermoelectric element housing.

The heating and cooling apparatus may further include a condensed water outlet formed in one of the diverging air outlets, through which the condensed water formed from air cooled by the thermoelectric element assembly, is discharged.

The thermoelectric element may further have cylinder wicks fitted into the condensed water passages, wherein the cylinder wicks are porous.

The heating and cooling apparatus may further include a flow rate controller provided between the thermoelectric element assembly and the blower, wherein the flow rate controller deflects a flow of air inside the duct toward one side of the thermoelectric element assembly, wherein the flow rate controller deflects a flow of air so that more air passes through a cooler than through a heater of the thermoelectric element assembly.

In another aspect of the present invention, a heating and cooling apparatus for a vehicle seat, may include a blower blowing air into a duct leading to the vehicle seat, a thermoelectric element assembly connected to the duct and including a thermoelectric element that heats or cools air introduced toward the seat from the duct, the thermoelectric element having condensed water passages penetrating from one side to the other side thereof, and a condensed water outlet formed in the duct through which condensed water formed from air, which is cooled by the thermoelectric element assembly, is discharged, wherein the duct has a bend where the condensed water formed inside the duct collects, and wherein the condensed water outlet is formed in a bottom of the bend.

In further another aspect of the present invention, the heating and cooling system for a vehicle seat, may include a blower blowing air into a first duct leading to the back of the vehicle seat and into a second duct leading to a lower portion of the vehicle seat, a first thermoelectric element assembly connected to the first duct and including a first thermoelectric element that heats or cools air introduced into the first duct, the first thermoelectric element having first condensed water passages penetrating from one side to the other side thereof, and a second thermoelectric element assembly connected to the second duct and including a second thermoelectric element that heats or cools air introduced into the second duct, the second thermoelectric element having second condensed water passages penetrating from one side to the other side thereof.

The heating and cooling apparatus may further include a first flow rate controller provided between the first thermoelectric element assembly and the blower, wherein the first flow rate controller deflects a flow of air inside the first duct toward one side of the first thermoelectric element assembly, and a second flow rate controller provided between the second thermoelectric element assembly and the blower, wherein the second flow rate controller deflects a flow of air inside the second duct toward one side of the second thermoelectric element assembly.

The heating and cooling apparatus may further include a first thermoelectric element housing coupled to one end of the first duct and enclosing the first thermoelectric element assembly therein, wherein the first thermoelectric element housing has diverging air outlets through which air cooled by a cooler of the first thermoelectric element assembly and air heated by the heater of the first thermoelectric element assembly are separately exhausted from the first thermoelectric element housing, and wherein a first condensed water outlet is formed in the first duct and condensed water formed from air cooled by the first thermoelectric element assembly is discharged therethrough.

The heating and cooling apparatus further include a second thermoelectric element housing coupled to one end of the second duct and enclosing the second thermoelectric element assembly therein, wherein the second thermoelectric element housing has diverging air outlets through which air cooled by a cooler of the second thermoelectric element assembly and air heated by the heater of the second thermoelectric element assembly are separately exhausted from the second thermoelectric element housing, and wherein a second condensed water outlet is formed in one of the diverging air outlets and condensed water formed from air cooled by the second thermoelectric element assembly, is discharged therethrough.

According to various aspects of the present invention as set forth above, the heating and cooling system for a vehicle seat can maintain comfortable environment inside a vehicle by efficiently discharging condensed water, which forms in the duct due to the thermoelectric element.

In addition, the heating and cooling system can improve the operating efficiency of the thermoelectric element by lowering the temperature of the heater by migrating condensed water, formed in the cooler side of the thermoelectric element, to the heater of the thermoelectric element.

Moreover, the heating and cooling system can discharge condensed water regardless of the orientation of the duct since the condensed water is caused to flow to the heater by capillary action, thereby improving the degree of freedom of design.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
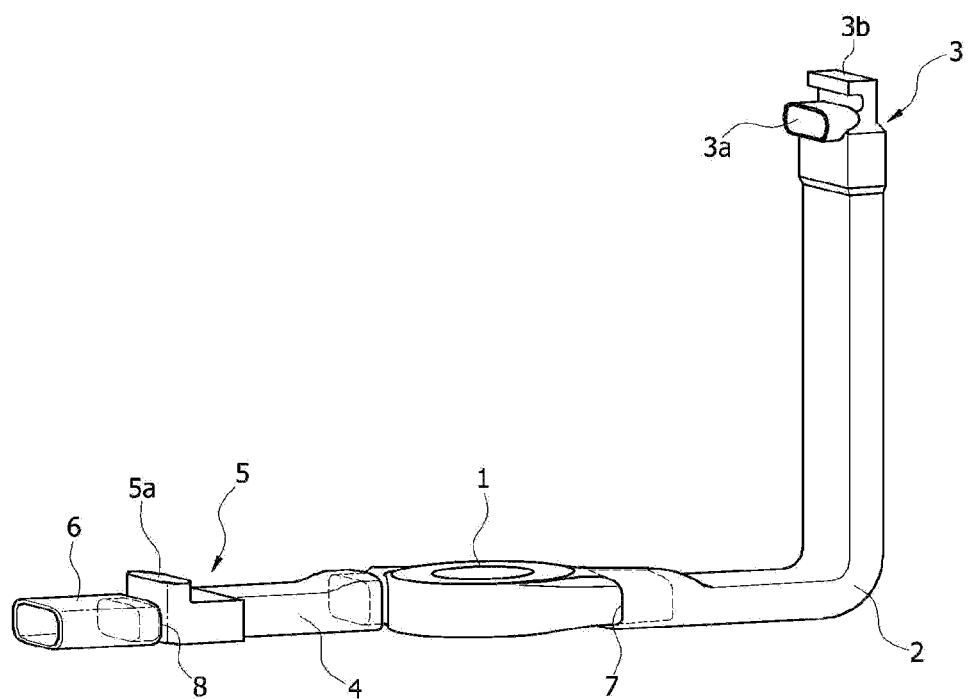
FIG. 1 is a perspective view showing a heating and cooling system for a vehicle seat of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Above all, reference should be made to the drawings, in which the same reference numerals and signs are used throughout the different drawings to designate the same or similar components. In the following description of the present invention, a detailed description of known functions and components incorporated herein will be omitted when it may make the subject matter of the present invention rather unclear.

Figure 2:
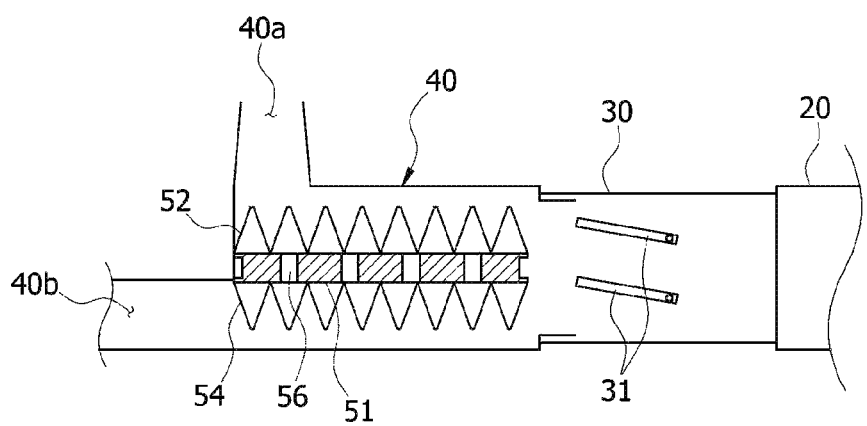
FIG. 2 is a cross-sectional view showing an exemplary heating and cooling system for a vehicle seat in accordance with the invention.
Figure 3:
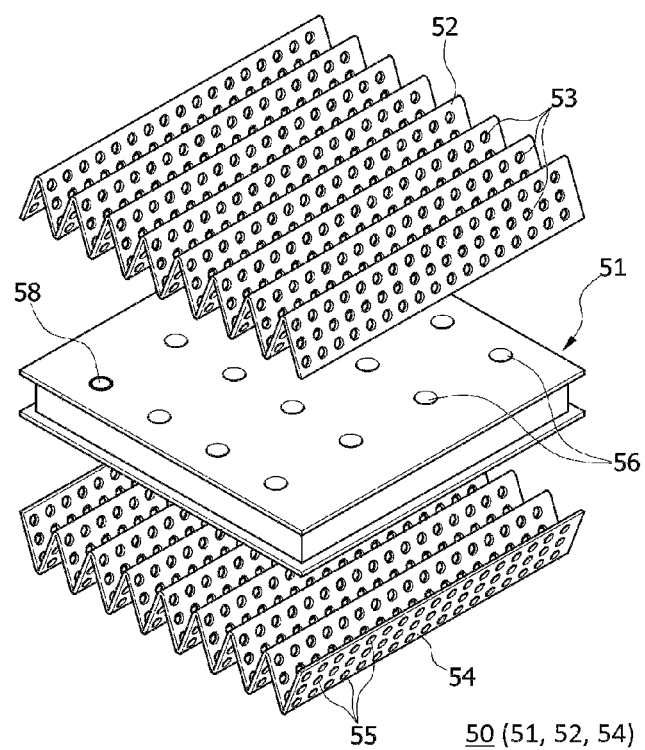
FIG. 3 is an exploded perspective view showing a thermoelectric assembly mounted in the exemplary heating and cooling system for a vehicle seat in accordance with the invention.

FIG. 2 is a cross-sectional view showing a heating and cooling system for a vehicle seat in accordance with one exemplary embodiment of the invention, and FIG. 3 is an exploded perspective view showing a thermoelectric assembly mounted in the heating and cooling system for a vehicle seat in accordance with one exemplary embodiment of the invention.

As shown in FIG. 2, the heating and cooling system for a vehicle seat in accordance with one exemplary embodiment of the invention includes a blower 20, a thermoelectric element assembly 50, a thermoelectric element housing 40, and a flow rate controller 31. The blower 20 blows air into a duct 30 that leads to the vehicle seat. The thermoelectric element assembly 50 includes a thermoelectric element 51 that heats or cools air introduced toward the seat. The thermoelectric element 51 has condensed water passages 56 penetrating from one side to the other side. The thermoelectric element housing 40 is coupled with the front end of the duct 30. The thermoelectric element assembly 50 is mounted inside the thermoelectric element housing 40. Air outlets 40a and 40b diverge from the thermoelectric element housing 40 such that air cooled by a cooler and air heated by a heater are separately exhausted through the outlets 40a and 40b. The flow rate controller 31 is provided between the thermoelectric element assembly 50 and the blower 20 in order to deflect the flow of air inside the duct 30 toward one side of the thermoelectric element assembly 50.

The blower 20 is electrically connected to and operates on a battery. The blower 20 generates a flow of air inside the duct 30 by supplying air to the duct 30 by taking in the air from outside.

The thermoelectric element assembly 50 includes the thermoelectric element 51, both sides of which are heated or cooled when a current is passed around the thermoelectric element 51, and heat sink fins 52 and 54, which are in contact with both sides of the thermoelectric element 51 in a heat conductive structure. As is known in the art, when a current is passed around the thermoelectric element 51, one side is heated and the other side is cooled. The side to be heated is changed according to the direction of current applied. Accordingly, when the current is supplied, one side of the thermoelectric element 51, which is heated, together with the heat sink fins 54 in contact with the heated side serves as a heater, and the other side of the thermoelectric element 51, which is cooled, together with the heat sink fins 52 in contact with the cooled side serves as a cooler.

The heat sink fins 52 and 54 are configured to maximize the contact area between heat or cold air generated by the thermoelectric element 51 and air flowing through the duct 30. A plurality of through-holes 53 and 55 are formed in the heat sink fins 52 and 54. The through-holes 53 and 55 in the heat sink fins 52 and 54 allow air to flow through the duct 30 without being blocked by the heat sink fins 52 and 54. In addition, when condensed water is formed by cooler-side heat sink fins of the thermoelectric element assembly 50, it can flow to the thermoelectric element 51 through the through-holes 53 and 55 in the heat sink fins 52 and 54. Then, the condensed water flows toward the heater of the thermoelectric element 51 through the condensed water passages 56 in the thermoelectric element 51, which will be described later.

The heat sink fins 52 and 54 are shaped as corrugated plates, but can be modified into fin shapes. The heat sink fins 52 and 54 can have any shape that allows air to come into contact with and pass through the heat sink fins 52 and 54 while flowing toward the air outlet through the duct 30 and that allows condensed water, formed by the cooler-side heat sink fins, to flow toward the cooling surface of the thermoelectric element 51.

The thermoelectric element assembly 50, including the thermoelectric element 51 and the heat sink fins 52 and 54, is provided inside the thermoelectric element housing 40 such that the thermoelectric element 51 is oriented in parallel with the flow of air inside the duct 30. A portion of air, flowing through the duct 30, is cooled or heated by contact with the heat sink fins 52 on one side of the thermoelectric element assembly 50 and is then supplied to the seat through the seat-side outlet 40a. The remaining portion of air, flowing through the duct 30, is heated or cooled by contact with the heat sink fins 54 on the other side of the thermoelectric element assembly 50 and is then exhausted from a vehicle through the outlet 40b.

In the thermoelectric element 51, the condensed water passages 56 penetrate from one side to the other side such that condensed water, which forms when the heating and cooling system for a vehicle seat is in operation, flows from the cooler to the heater through the condensed water passages 56. Specifically, when the heating and cooling system for a vehicle seat is in operation, air coming into contact with the cooler is cooled down so that its moisture condenses into water. Condensed water forms on the surface of the thermoelectric element 51, and then flows to the heater along the condensed water passages 56. Accordingly, the diameter of the condensed water passages 56 can be determined so as to allow condensed water to flow by capillary action.

Cylinder wicks 58 can be fitted into the condensed water passages 56. The cylinder wicks 58 are designed to promote capillary action that drives condensed water from the cooler to the heater, and are made of a material such as a polyvinyl alcohol (PVC), sponge, or pulp. The cylinder wicks 58 have a porous structure to promote capillary action.

When the cylinder wicks 58 are fitted into the condensed water passages 56 to penetrate through the thermoelectric element 51, condensed water formed by the cooler can flow to the heater through a plurality of fine pores of the cylinder wicks 58 installed in the thermoelectric element 51.

Since condensed water flows from the cooler to the heater by capillary action regardless of gravity, the heating and cooling system for a vehicle seat of this embodiment can discharge condensed water regardless of the orientation of the duct 30. Even if the thermoelectric element 51 is vertically oriented instead of being in parallel with respect to the ground surface, condensed water formed by the cooler can flow to the heater. Furthermore, in the case where the thermoelectric element 51 is provided in parallel with the ground surface, the cooler of the thermoelectric element 51 may be oriented to face the ground according to the direction of a current to be applied. Even in this case, condensed water formed in the cooler can flow to the heater through the through-holes 53 or the passages of the cylinder wicks 58.

The flow rate controller 31 is provided between the thermoelectric element assembly 50 and the blower 20 in order to deflect a flow of air inside the duct 30 toward one side of the thermoelectric element assembly 50. This configuration is to facilitate migration of condensed water, formed in the cooler, to the heater of the thermoelectric element 50. If more air passes through the cooler than through the heater, the wind pressure of the cooler rises above that of the heater, thereby facilitating migration of condensed water from the cooler to the heater. In the case where the flow rate controller 31 controls more air to flow toward the cooler than toward the heater of the thermoelectric element assembly 50, the ability to reversibly change the flow of air is necessary since the position of the cooler of the thermoelectric element assembly 50 may vary according to the direction of a current applied. For this, the flow rate controller 31 designed in the shape of blades is pivotally provided inside the duct 30. Accordingly, air flowing through the duct 30 can be deflected toward one or the other side of the thermoelectric element assembly 50 according to the direction indicated by the flow rate controller 31.

Figure 4:
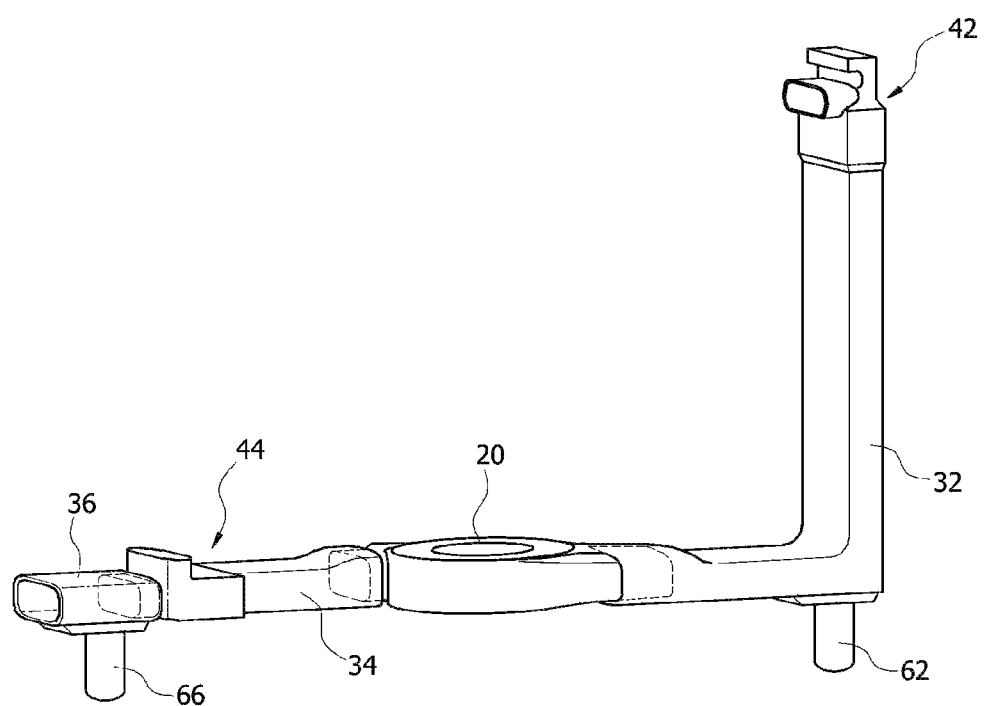
FIG. 4 is a perspective view showing an exemplary heating and cooling system for a vehicle seat in accordance with the invention.
Figure 5:
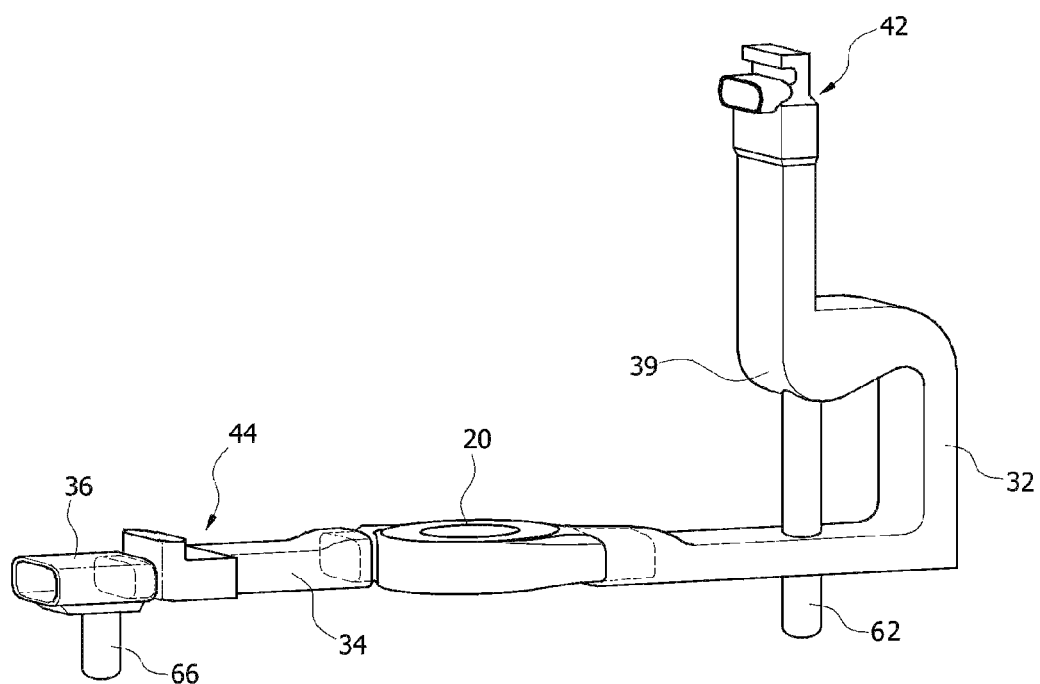
FIG. 5 is a perspective view showing an exemplary heating and cooling system for a vehicle seat in accordance with the invention.

FIGS. 4 and 5 show a heating and cooling system for a vehicle seat in accordance with a second embodiment of the invention. In this embodiment, condensed water outlets 62 and 66 are provided as means for discharging condensed water.

The heating and cooling system of this embodiment is mounted on the lower part of a vehicle seat composed of a back and a sitting part, and includes a first duct 32 leading to the back, a second duct 34 leading to the sitting part, and a blower 20 flowing air into the ducts 32 and 34. A thermoelectric element housing 42, inside of which a thermoelectric element assembly is mounted, is coupled to the front end of the duct 32, and a thermoelectric element housing 44, inside of which a thermoelectric element assembly is mounted, is coupled to the front end of the duct 34. Each of the thermoelectric element housings 42 and 44 defines, therein, a seat-side supply port through which air heated or cooled by the thermoelectric element assembly is supplied to the seat and an exhaust port through which air is exhausted from a vehicle. This embodiment also employs a thermoelectric element assembly as means for heating air to be supplied to the seat. Referring to FIGS. 2 and 3, like the first embodiment, the thermoelectric element assembly can preferably be configured such that the condensed water passages 56 are formed in the thermoelectric element 51 and the cylinder wicks 58 are fitted into the condensed water passages 56 in order to facilitate migration of condensed water to the heater. However, even if the condensed water passages 56, through which condensed water flows from the cooler to the heater, are not formed, this embodiment provides the condensed water outlets 62 and 66 in one portion of the ducts 32 and 36 where condensed water formed inside the ducts 32 and 36 will collect. With this configuration, the condensed water can be discharged to the outside through the condensed water outlets 62 and 66.

In order to enhance the discharge efficiency by collecting condensed water, formed inside the duct 32, in a specific position, the duct 32 can be bent, as shown in FIG. 5, thereby forming a bend 39 in the middle thereof.

The bent shape of the duct 32 can vary according to the direction of the duct 32. As shown in FIG. 5, when the duct 32 is oriented in the vertical direction, the bend 39 of the duct 32 can preferably be "S" shaped. If the duct 32 is oriented in the horizontal direction, the bend 39 of the duct 32 can be "V" shaped. The structures of the bend and the exhaust port of the ducts 32 and 36 are not limited to those illustrated in this embodiment, but can be modified into various forms.

Below, a description will be given of the operation of the heating and cooling system for a vehicle seat in accordance with the first exemplary embodiment of the invention by referring to the above-described components.

When the heating and cooling system of this embodiment is operated in order to supply cold or warm air to the vehicle seat, a voltage is supplied to the blower 20 so that wind is supplied to the seat through the duct 30.

Air flowing through the duct 30 passes through the thermoelectric element assembly 50 before being supplied to the seat. One portion of the air inside the duct 30 flows in contact with the heater-side heat sink fins 54 of the thermoelectric element assembly 50, and the rest of the air flows in contact with the cooler-side heat sink fins 52 of the thermoelectric element assembly 50. The temperature of the air, coming into contact with the cooler-side heat sink fins 52 of the thermoelectric element assembly 50, is lowered, and condensed water forms around the cooler of the thermoelectric element 51 when the temperature drops below the dew point. The condensed water formed around the cooler of the thermoelectric element 51 flows to the heater through the cylinder wicks 58 by capillary action. The heater heats and evaporates the condensed water so that it can be exhausted from the vehicle on the air that flows through the heater.

As such, the condensed water formed in the cooler lowers the temperature of the heater while being evaporated by the heater. This, as a result, can improve the operating efficiency of the thermoelectric element assembly 50.

When the flow rate controller 31 controls the flow of air so that more air flows through the cooler than through the heater of the thermoelectric element assembly 50, the wind pressure acting on the cooler is higher than the wind pressure acting on the heater so that the condensed water can more efficiently flow from the cooler toward the heater.

Next, a description will be given of the operation of the heating and cooling system for a vehicle seat in accordance with the second exemplary embodiment of the invention.

When air flows through the ducts 32 and 34, forced by the blower 20, it passes through the thermoelectric element assembly 50. One portion of the air inside the duct 32 flows in contact with the heater of the thermoelectric element assembly 50, and the rest of the air flows in contact with the cooler of the thermoelectric element assembly 50. The temperature of the air flowing through the duct 32 is lowered due to the contact of the air with the cooler of the thermoelectric element assembly 50, and condensed water forms around the cooler of the thermoelectric element assembly 50 when the temperature of the air drops below the dew point. In the back-side duct 32 oriented in the vertical direction, the condensed water flows down along the inside wall of the duct 32, collects on the bottom of the duct 32, and then is discharged to the outside through the condensed water outlet 62. In the sitting part-side duct 34 oriented in the horizontal direction, the condensed water is pushed by the flowing air, collects in the exhaust duct 36, and then is discharged to the outside through the condensed water outlet 66 formed in the bottom of the exhaust duct 36.

In this case, if the "S" or "V" shaped bend 39 is formed in the duct 32 or 36, the condensed water inside the duct 32 or 36 collects in the bend 39 and is then discharged through the condensed water outlet 62 in the bend 39.

For convenience in explanation and accurate definition in the appended claims, the terms "lower" or "upper" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating and cooling apparatus for a vehicle seat, comprising:
    a blower blowing air into a duct leading to the vehicle seat;
    a thermoelectric element assembly connected to the duct and including:
        a thermoelectric element that heats or cools air introduced toward the vehicle seat from the duct, the thermoelectric element having condensed water passages penetrating the thermoelectric element to allow condensed water to flow therethrough; and
        first heat sink fins attached to a bottom surface of the thermoelectric element, wherein the first heat sink fins are in an inverse triangular shape; and
    a flow rate controller provided between the thermoelectric element assembly and the blower and deflecting a flow of air so that more air passes through a cooler than through a heater of the thermoelectric element assembly, thereby facilitating migration of the condensed water through the condensed water passages from the cooler to the heater of the thermoelectric element assembly.

2. The heating and cooling apparatus in accordance with claim 1, wherein the condensed water passages allow the condensed water to flow toward a heater of the thermoelectric element by capillary action.

3. The heating and cooling apparatus in accordance with claim 1, wherein the thermoelectric element assembly further includes second heat sink fins attached to an upper surface the second heat sink fins having a triangular shape.

4. The heating and cooling apparatus in accordance with claim 3, wherein the first and second heat sink fins have a plurality of through-holes to allow the air to flow therethrough.

5. The heating and cooling apparatus in accordance with claim 3, wherein the first and second heat sink fins are formed in a perpendicular direction to a longitudinal direction of the duct.

6. The heating and cooling apparatus in accordance with claim 1, further comprising a thermoelectric element housing coupled to one end of the duct and enclosing the thermoelectric element assembly therein,
    wherein the thermoelectric element housing has diverging air outlets through which air cooled by a cooler of the thermoelectric element assembly and air heated by the heater of the thermoelectric element assembly are separately exhausted from the thermoelectric element housing.

7. The heating and cooling apparatus in accordance with claim 6, further comprising a condensed water outlet formed in one of the diverging air outlets, through which the condensed water formed from air cooled by the thermoelectric element assembly, is discharged.

8. The heating and cooling apparatus in accordance with claim 1, wherein the thermoelectric element further has cylinder wicks fitted into the condensed water passages.

9. The heating and cooling apparatus in accordance with claim 8, wherein the cylinder wicks are porous.

10. A heating and cooling apparatus for a vehicle seat, comprising:
    a blower blowing air into a duct leading to the vehicle seat;
    a thermoelectric element assembly connected to the duct and including:
        a thermoelectric element that heats or cools air introduced toward the seat from the duct, the thermoelectric element having condensed water passages penetrating the thermoelectric element; and
        first and second heat sink fins attached to opposite sides of the thermoelectric element respectively;
    a flow rate controller provided between the thermoelectric element assembly and the blower and deflecting a flow of air so that more air passes through a cooler than through a heater of the thermoelectric element assembly, thereby facilitating migration of the condensed water from the cooler to the heater of the thermoelectric element assembly; and
    a condensed water outlet formed in the duct through which condensed water formed from air, which is cooled by the thermoelectric element assembly, is discharged;
    wherein the first heat sink fins attached to a bottom surface of the thermoelectric element are in an inverse triangular shape; and
    wherein the second heat sink fins attached to an upper surface of the thermoelectric element are in a triangular shape.

11. The heating and cooling apparatus in accordance with claim 10,
    wherein the duct has a bend where the condensed water formed inside the duct collects, and
    wherein the condensed water outlet is formed in a bottom of the bend.

12. A heating and cooling system for a vehicle seat, comprising:
    a blower blowing air into a first duct leading to the back of the vehicle seat and into a second duct leading to a lower portion of the vehicle seat;
    a first thermoelectric element assembly connected to the first duct and including a first thermoelectric element that heats or cools air introduced into the first duct, the first thermoelectric element having first condensed water passages penetrating the first thermoelectric element to allow condensed water to flow therethrough;
    a second thermoelectric element assembly connected to the second duct and including a second thermoelectric element that heats or cools air introduced into the second duct, the second thermoelectric element having second condensed water passages penetrating the second thermoelectric element to allow condensed water to flow therethrough; and
    a first flow rate controller and/or a second flow rate controller, wherein
    the first flow rate controller is provided between the first thermoelectric element assembly and the blower and deflects a flow of air inside the first duct so that more air passes through a cooler than through a heater of the first thermoelectric element assembly, thereby facilitating migration of the condensed water through the first condensed water passages from the cooler to the heater of the first thermoelectric element assembly; and the second flow rate controller is provided between the second thermoelectric element assembly and the blower and deflects a flow of air inside the second duct so that more air passes through a cooler than through a heater of the second thermoelectric element assembly, thereby facilitating migration of the condensed water through the second condensed water passages from the cooler to the heater of the second thermoelectric element assembly;

wherein the second thermoelectric element assembly includes second heat sink fins attached to a bottom surface of the second thermoelectric element, the second heat sink being in an inverse triangular shape.

13. The heating and cooling system in accordance with claim 12, further comprising a first thermoelectric element housing coupled to one end of the first duct and enclosing the first thermoelectric element assembly therein, wherein the first thermoelectric element housing has diverging air outlets through which air cooled by a cooler of the first thermoelectric element assembly and air heated by the heater of the first thermoelectric element assembly are separately exhausted from the first thermoelectric element housing, and wherein a first condensed water outlet is formed in the first duct and condensed water formed from air cooled by the first thermoelectric element assembly is discharged therethrough.

14. The heating and cooling system in accordance with claim 12, further comprising a second thermoelectric element housing coupled to one end of the second duct and enclosing the second thermoelectric element assembly therein, wherein the second thermoelectric element housing has diverging air outlets through which air cooled by a cooler of the second thermoelectric element assembly and air heated by the heater of the second thermoelectric element assembly are separately exhausted from the second thermoelectric element housing, and wherein a second condensed water outlet is formed in one of the diverging air outlets and condensed water formed from air cooled by the second thermoelectric element assembly, is discharged therethrough.

15. The heating and cooling system in accordance with claim 12, wherein the first thermoelectric element assembly includes first heat sink fins attached to an upper surface of the first thermoelectric element, the first heat sink fins being in a triangular shape.

* * * * *